Nov. 5, 1968

L. A. DE PAS 3,409,246

CORD REEL APPARATUS

Filed Oct. 31, 1966

INVENTOR
LADDIE A. DePAS

BY Hofgren, Wegner, Allen,
Stellman & McCord.

ATTORNEYS

Nov. 5, 1968  L. A. DE PAS  3,409,246

CORD REEL APPARATUS

Filed Oct. 31, 1966  3 Sheets-Sheet 2

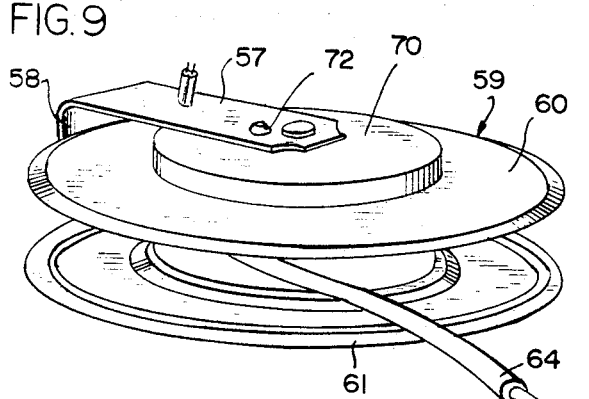
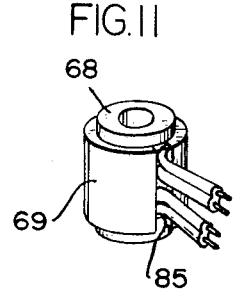
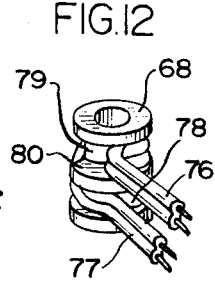
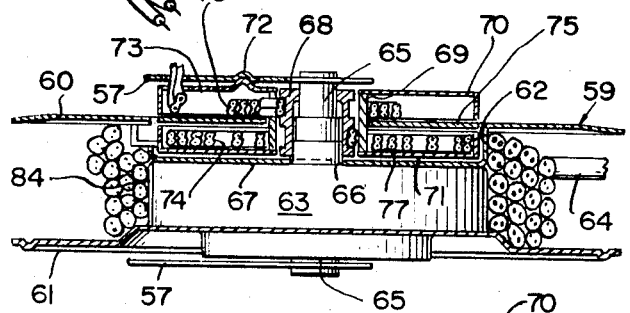
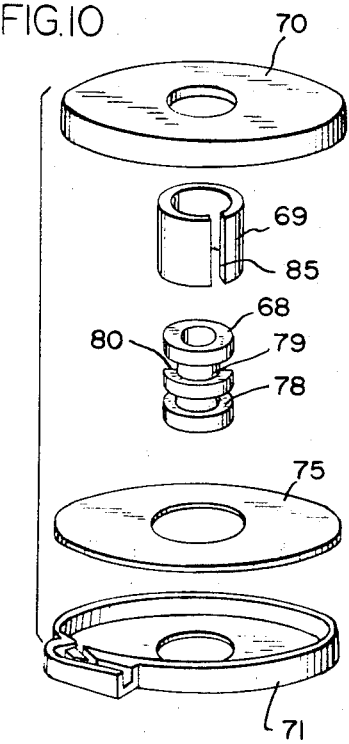
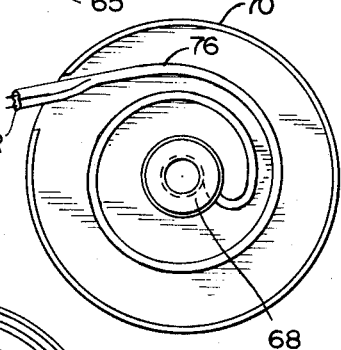
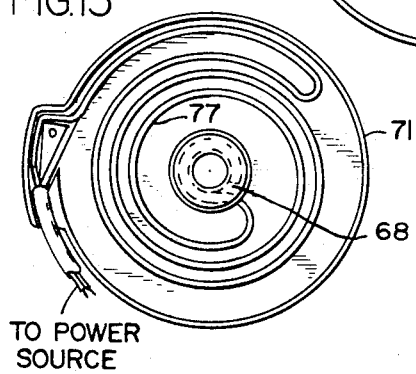

United States Patent Office 3,409,246
Patented Nov. 5, 1968

3,409,246
CORD REEL APPARATUS
Laddie A. De Pas, Benton Harbor, Mich., assignor to Whirlpool Corporation, a corporation of Delaware
Filed Oct. 31, 1966, Ser. No. 590,694
4 Claims. (Cl. 242—107)

ABSTRACT OF THE DISCLOSURE

A cord reel apparatus having an inner reel and an outer reel area whereby the cord on the inner reel first unwinds and then rewinds upon unwinding the cord on the outer reel area. This eliminates the need for slip rings.

---

This invention relates to a cord reel apparatus with which an elongated cord such as an electric cord may be wound and unwound on a reel.

In certain appliances such as vacuum cleaners employing long cords for supplying power to a motor it has been proposed to provide rotatable reels on which the cord may be wound for storage and from which the cord may be played out when the appliance is being used. Because the reel is rotatable while it is necessary to have fixed electrical connection to the cord to the item being powered, such as the motor, it has been customary to provide sliding contacts capable of transferring electricity during rotation of the reel.

One of the features of this invention is to provide an improved simplified cord reel that avoids use of such sliding contacts and also uses a shorter connector cord forming an extension of the main elongated cord with this connector cord having its own reel rotatable with the reel for the elongated cord and in the same relative direction so that as the elongated cord is wound on its reel the shorter connector cord is unwound and then rewound, simultaneously, on its reel. With this arrangement there is no excessive bending of the connector cord, the connection of the connector cord to the motor or other power receiving apparatus is much simplified and a compact and efficient structure results.

Other features and advantages of the invention will be apparent from the following description of certain embodiments thereof taken in conjunction with the accompanying drawings. Of the drawings:

FIGURE 9 is a perspective view of a third embodiment of the invention.

FIGURE 10 is an exploded perspective view of a portion of the cord reel apparatus of FIGURE 9.

FIGURE 11 is a perspective view of a detail of this embodiment.

FIGURE 12 is a perspective view of a detail of FIGURE 11.

FIGURE 13 is a vertical sectional view taken substantially through the center of the embodiment of FIGURE 9.

FIGURE 14 is an interior view of an upper reel section of FIGURE 13.

FIGURE 15 is an interior view of a lower reel section of FIGURE 13.

Figure 2:
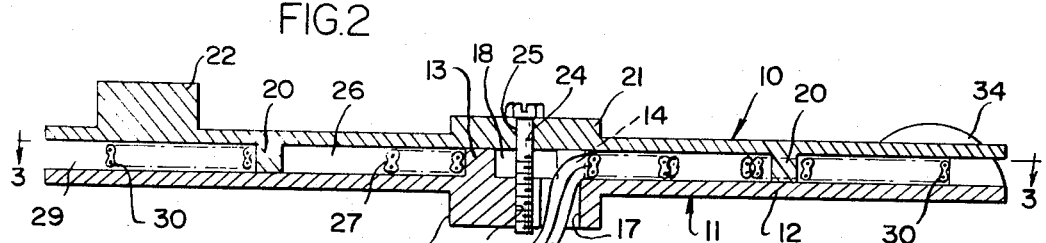
FIGURE 2 is a vertical sectional view taken substantially along line 2—2 of FIGURE 1.
Figure 3:
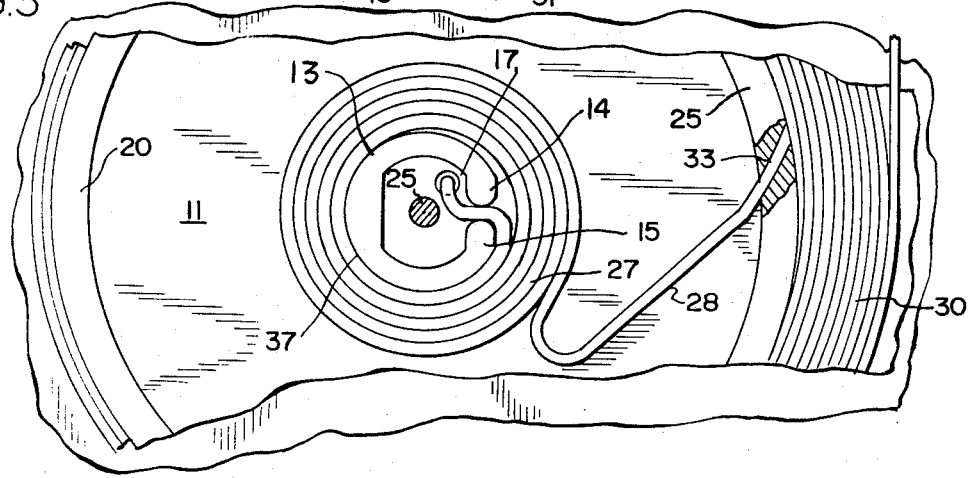
FIGURE 3 is a fragmentary horizontal sectional view taken substantially along line 3—3 of FIGURE 2.
Figure 4:
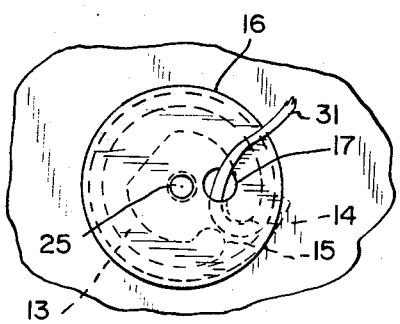
FIGURE 4 is a fragmentary bottom view of this reel apparatus.
Figure 5:
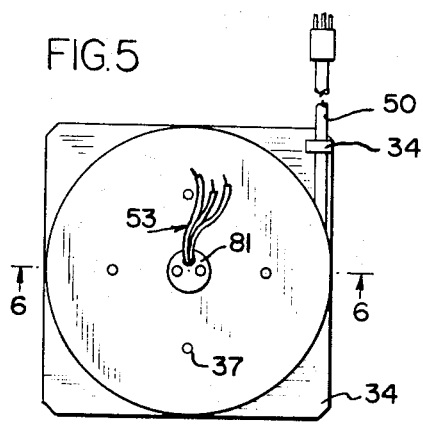
FIGURE 5 is a view similar to FIGURE 1 but showing a second embodiment of the invention.

In the embodiment of FIGURES 1–4, the cord reel 10 has a stationary base 11 preferably of metal or rigid plastic. Base 11 includes a planar member 12 from which a collar 13 extends upwardly therefrom. The collar 13 is generally C-shaped as shown in FIGURE 3. Collar 13 has rounded spaced but adjacent ends 14 and 15. An embossment 16 is located centrally of member 12. An opening 17 in embossment 16 communicates with chamber 18 which is defined by the C-shaped collar 13, and the outside of cord reel 10.

A disc-shaped planar member or reel 19 having an annular ring 20 extending downwardly therefrom, an embossment 21 located centrally thereof and a handle 22 is positioned above base 11 and is spaced therefrom by collar 13. Base 11 has a threaded opening 23 located centrally of embossment 16 and disc-shaped member or reel 19 has an aperture 24 located centrally of embossment 21 to receive bolt 25 for connecting the reel 19 with stationary base 11 for relative rotation therebetween. The bolt 25 then becomes the axis of rotation of disc-shaped member 19. Annular ring 20 which is concentric with the axis of rotation defines a first hollow annular chamber 26 for receiving a first portion 27 of an electrical cord 28 and a second hollow annular chamber 29 for receiving an elongated cord portion 30.

In the embodiment of FIGURES 1–4 the cord 28 is a customary two conductor wire cord, as shown in FIGURE 2. Portion 27 of this cord extends outwardly from chamber 26 between the ends 14 and 15 of C-shaped member 13 and through opening 17 in embossment 16. This end 31 of the cord is adapted to be connected to a motor or other device requiring power while the opposite end 32 of the cord is adapted to be connected to a source of electrical power.

Portion 27 of this cord also extends through an opening 33 in the ring 20 and from there through a guide bracket 34 having an opening 35 therein through which the cord extends.

With this arrangement, disc-shaped planar member 19 with its annular ring 20 provides the reel on which the elongated portion 30 of cord 28 can be wound by rotating the reel 19. The cord 28 can be played out from the reel by merely pulling on the end 32 that is beyond the guide bracket 34. The turning of the reel 19 by means of the handle 22 also turns the ring 20 to wind the cord 28 on the outer surface of the ring 20 and simultaneously unwinds and then rewinds portion 27 of the cord on the C-collar 13 which is a portion of base plate 11 and thus stationary. Thus, in this embodiment the outer surface of the ring 20 serves as a cord receiving surface for the elongated cord portion 30 while the collar 13 functions as a second cord receiving surface member receiving the inner portion 27 of the cord on its outer surface 37. In this embodiment the cord portion 30 is an elongated cord while portion 27 thereof functions as a shorter connector cord.

In the second embodiment of FIGURES 5–8 the reel apparatus uses a similar stationary base plate 111 also preferably of rigid plastic or metal material but here there is provided an upper circular parallel plate 36 extending across the top of an annular ring 41. This upper parallel plate 36 is attached by means of spaced screws 110 to an intermediate circular plate 38 that is spaced from the base plate 111 to provide an internal space 39 and from the top plate 36 to provide a space 40. The two plates 36 and 38 are held spaced apart by ring 41 through which the screws 110 extend. This ring 41 is integral with plate 38 and is cut away to provide a passage 42 as shown most clearly in FIGURE 7. At the center of the apparatus there is provided a C-shaped collar 43 whose bottom engages a raised center part 44 on the base plate 111 and which extends through the intermediate plate 38 to adjacent the upper parallel plate 36. The collar 43 is provided with a pair of attaching screws 45 extending downwardly therethrough to engage the center part 44 of the base plate 111. The top of the collar 43 is engaged by a circular cover 81 in a similar shaped opening in plate 36 and also held by the screws 45. The collar 43 has an off-center vertical opening 82 connected to a space 83 defined by plate 36, plate 38, ring 41 and C-shaped collar 43.

Located within the space 39 at the bottom of the apparatus is a circular ring 46 which is integral with plate 38. This ring is concentric to collar 43 and center part 44, the intermediate plate 38 and top plate 36. Cover plate 36 and intermediate plate 38 are connected for rotation about collar 43, cover 81 and base plate 111 which are fixed in position. Cover 81 has an outwardly extending annular shoulder portion 81a which acts as a stop to lateral movement of plates 36 and 38.

In the apparatus of this embodiment there is provided a take-up coil spring 47 in the bottom space 39. The outer end 48 of this spring is fastened to the lower ring 46 while the inner end 49 is attached to the center part 44.

In this embodiment the connector cord 53, a three wire cord, is adapted to be wound on the outer cord receiving surface 51 of the ring 41 in space 40 in coplanar coils 52. The inner end of this cord is stripped of the outer insulation cover to expose the three connector insulated wires 53. These connector wires 53 are adapted to be wound on the outer circular surface portion of the stationary collar 43 so that this collar 43 connstitutes a wire receiving surface member of a second reel means. The purpose of stripping the outer insulation from the cord 50 is to keep the space 83 as small as possible for a given length of cord 50 and to provide more flexibility of the cord in space 83.

Both the cord 50 and the connector wires 53, as in the first embodiment of FIGURES 1–4, are wound in the same relative direction. Therefore, as the cord 50 is pulled or played out from the cord reel apparatus the cord 50 is unwound from its surface member 41 while the inner connector wires 53 are first unwound from and then rewound on their surface member 43. When the cord is so pulled out it winds up the spring 47. The cord is then held in its played out position by means of a spring catch 55 engaging a shallow notch 56 in the outer surface of the ring 46. When it is desired to return the cord to the reel apparatus it is merely necessary to pull the cord 50 out further a fraction and then release it with the result that the shallow notches 56 can clear the end of the spring 55. When the cord 50 is pulled out a fraction further the shoulder against which the reel engaging end of the spring 55 bears (this being the shoulder at the right-hand end of the notch 56 in the lower part of FIGURE 8) engages the end of the spring 55 and bends it away from the outer surface of the ring 46. Then, when the cord 50 is released the tension built up in the spring 47 rotates the ring 46 so fast that the end of the spring 55 does not have an opportunity to move back into the notch 56 before the notch passes under the spring. Then, so long as the ring 56 is moved by the wind-up spring 47 each notch 56 clears the outer end of the spring catch 55 in the same manner. When it is desired to have the spring catch 55 engage a notch the speed of wind-up of the ring 46 is slowed as by applying a frictional drag to the cord 50 in order that the spring catch 55 can have time to move back into engagement with the next succeeding notch 56.

FIGURES 9–15 illustrate a third embodiment of the invention. In this embodiment the apparatus is adapted to be mounted on a supporting bracket 57 having a base portion 58. The bracket 57 supports the cord reel 59 for rotation thereon. The cord reel 59 comprises parallel plates 60 and 61 with the center of the one plate 60 being formed to provide a central circular inwardly extending chamber 62 and the other plate 61 being similarly shaped to provide a chamber 63. The outer cylindrical surfaces of the chambers 62 and 63 substantially coincide to constitute a cord receiving surface member 84 adapted to receive the elongated cord 64.

The flat inner surfaces of the chambers 62 and 63 are in contact with each other and are connected together. The cord reel 59 is provided with a central rigid shaft 65 whose ends are connected to the bracket 57. As can be seen in FIGURE 13 the shaft 65 which is fixed to the bracket 57 so that it is not rotatable extends through an opening 66 at the center of the base 67 of the chamber 62.

Rotatably mounted on the end of the shaft 65 that is outwardly of the chamber 62 is an assembly of an inner generally cylindrical cord guide member 68 and an outer cylindrical cord reel surface member 69. These members 68 and 69 which are shown in individual perspective in FIGURE 10 are located above the base 67 of the chamber 62. Surrounding the member 69 are outer 70 and inner 71 cylindrical dish-shaped members whose open sides face each other to define an internal space 73–74 around the cord receiving surface member 69. The inner member 71 rotates with the reel 60 while the outer member 70 is fixed in position as by a boss 72. A central annular divider 75 divides the chamber formed by the facing members 70 and 71 into an upper section 73 and a lower section 74. This divider plate 75 is arranged aronud the cord surface member 69 and is free to rotate thereon.

In this embodiment the chamber sections 73 and 74 receive the connector cord which is in two sections 76 and 77 with the upper section 76 being located in the upper chamber 73 and the lower part 77 located in the lower chamber 74. The cord extends between these two chambers by way of the guide member 68 that is provided with spaced parallel grooves 78 and 79 interconnected by cutaway part 80. With this arrangement, as is shown in FIGURE 12, the cord extends through slot 85 in surface member 69 and passes from one groove to the other by way of this part 80.

With this arrangement, as in the first two embodiments, rotation of the reel 59 in a wind-up direction causes the cord 64 to be wound in coils as shown in FIGURE 13. At the same time, the connector cord section 77 is wound on the outer surface of the surface member 69. Once the entire portion of connector cord section 77 is wound on the member 69 the freely rotatable member 69 is then held by the coils of part 77 and turned to wind the upper part 76 of the connector cord on its end of the surface member 69.

The advantage of the embodiment of FIGURES 9–15 is that the connector cord may be very much longer than in the first two embodiments because it is wound in vertical sections with the sections being wound in series. As is shown in FIGURE 13, this embodiment utilizes two sections of cord and two separate winding chambers 73 and 74, although as many sections could be provided as desired depending upon the length of the connector cord.

Figure 1:
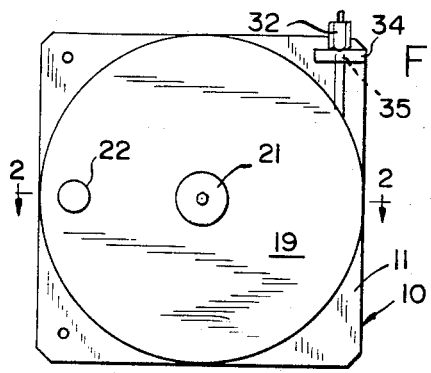
FIGURE 1 is a plan view of a cord reel apparatus embodying the invention.
Figure 17:
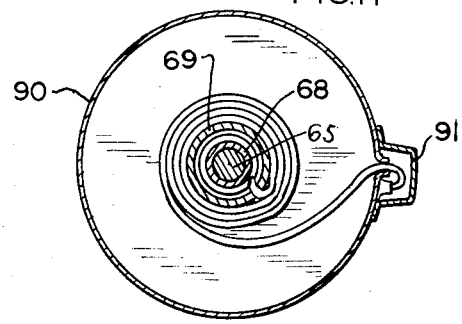
FIGURE 17 is a sectional view taken along line 17—17 of FIGURE 16.
Figure 16:
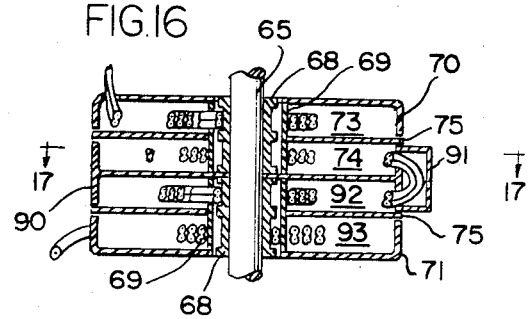
FIGURE 16 is a view similar to FIGURE 13 but showing another embodiment.
Figure 6:
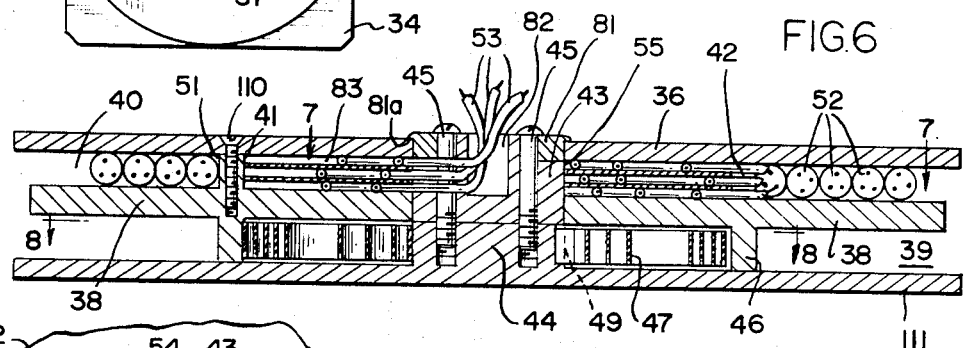
FIGURE 6 is a vertical sectional view taken substantially along line 6—6 of FIGURE 5.
Figure 7:
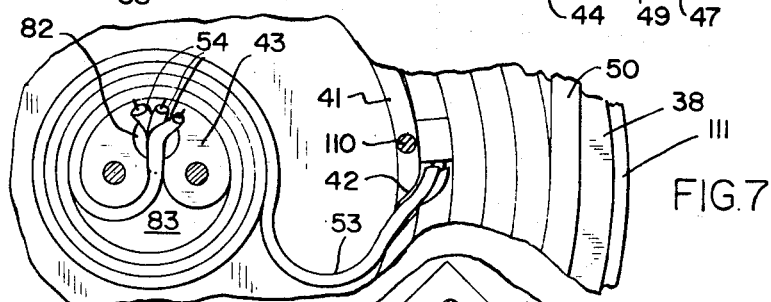
FIGURE 7 is a fragmentary sectional view taken substantially along line 7—7 of FIGURE 6.
Figure 8:
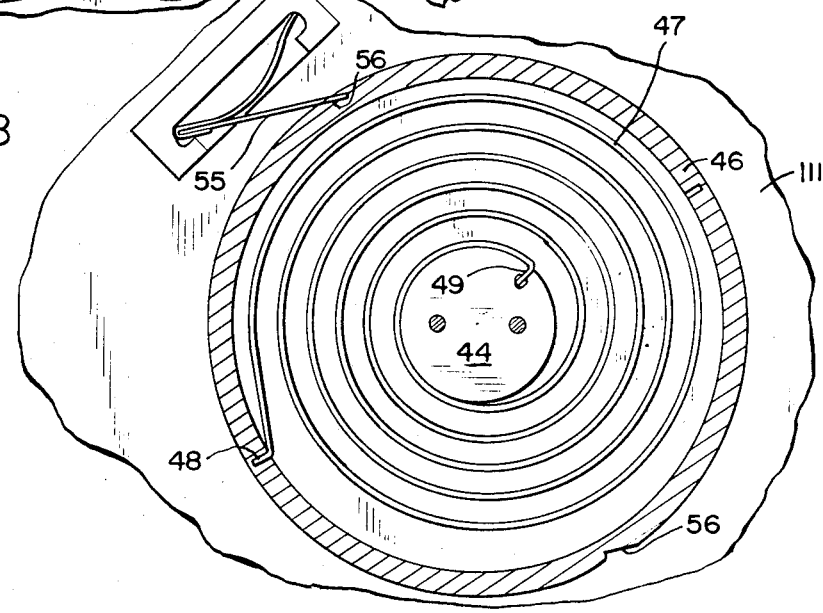
FIGURE 8 is a fragmentary sectional view taken substantially along line 8—8 of FIGURE 6.

FIGURES 16 and 17 illustrate a variation of the upper reel section of FIGURE 13. This variation provides for the vertical stacking of reel sections to increase the connector cord length without increasing the outer diameter of the upper reel section. All portions of this upper reel section are identical to the ones shown in FIGURE 13, except portion 90 which has a vertical chamber 91 which communicates with chambers 74 and 92. The connector cord passes through chamber 91 to chamber 92 from chamber 74, thereby providing an equally as long length of continuous connector cord in chambers 92 and 93 as in chambers 73 and 74. This allows a proportional increase in length of the main elongated cord.

It should be understood that an infinite number of upper reel sections may be stacked to proportionally increase the main elongated cord length. In operation, as the main elongated cord is played out the connector cord in chambers 92 and 93 will first unwind and then rewind about its surface member 69. When the connector cord in chambers 92 and 93 has completely rewound on its surface member 69, the connector cord in chambers 73 and 74 will first unwind and then rewind on its surface member 69. The chamber 91 provides a continuous connection between the pairs of chambers 73 and 74, and 92 and 93. However, the connector cord does not slide through chamber 91 during operation of the reel.

Having described my invention as related to the embodiments shown in the accompanying drawings, it is my intention that the invention be not limited by any of the details of description, unless otherwise specified, but rather be construed broadly within its spirit and scope as set out in the accompanying claims.

The embodiments of the invention in which an exclusive property or privilege is claimed are defined as follows:

1. A cord reel apparatus, comprising: an elongated cord adapted to be extended away from and drawn back on a cord reel means; a shorter connector cord forming an extension of said elongated cord at the reel means end of said elongated cord; a rotatable first reel means having a cord receiving surface member on which said elongated cord is wound on rotating the reel means in one direction and played out with rotation of said reel in the opposite direction; a freely rotatable second reel means having a cord receiving surface member on which said connector cord is unwound and rewound, said surface member of said second reel means having a smaller peripheral extent than said surface member of the first reel means; a divider plate means through which said second surface member extends, a first portion of said connector cord being located on one side of said plate means and a second portion on the other side of said plate means; and means for rotating said first reel means to wind said elongated cord thereon and simultaneously unwind and then rewind said connector cord on its cord receiving surface member, and to play out said elongated cord therefrom and simultaneously unwind and then rewind said connector cord on its cord receiving surface.

2. The apparatus of claim 1 wherein there is provided a cord guide member adjacent said second surface member directing said connector cord from said one side to said other side of the plate means.

3. The apparatus of claim 2 wherein said cord guide member is provided with a cord engaging peripheral groove, one portion of which is on said one side and another portion of which is on said other side.

4. The apparatus of claim 3 wherein said second surface member is generally cylindrical with a longitudinal groove through one side thereof through which said connector cord extends, the cord guide member being located within said cylindrical second surface member and the assembly of cord guide member and second surface member being rotatably mounted on said shaft means.

References Cited

UNITED STATES PATENTS

| | | | |
|---|---|---|---|
| 1,171,745 | 2/1916 | Mundy | 242—107 X |
| 1,276,825 | 8/1918 | Swope | 242—107.1 |
| 1,446,410 | 2/1923 | Bennett et al. | 242—107.1 |
| 1,958,626 | 5/1934 | Krantz | 242—107.7 |
| 2,219,201 | 10/1940 | Smith | 242—107.6 X |
| 2,518,071 | 8/1950 | Rushworth | 242—107.1 |
| 3,061,234 | 10/1962 | Morey | 242—107.1 |

FOREIGN PATENTS

| | | |
|---|---|---|
| 697,640 | 9/1953 | Great Britain. |

WILLIAM S. BURDEN, *Primary Examiner.*